United States Patent [19]

Murano et al.

[11] Patent Number: 4,562,573
[45] Date of Patent: Dec. 31, 1985

[54] METHOD AND APPARATUS FOR ADJUSTING CHANNEL INSERTION TIMING

[75] Inventors: Kazuo Murano, Tokyo; Tetsuo Soejima, Musashino; Shigeo Amemiya, Yokohama, all of Japan

[73] Assignee: Fujitsu Limited, Kawasaki, Japan

[21] Appl. No.: 533,968

[22] Filed: Sep. 20, 1983

[30] Foreign Application Priority Data

Sep. 22, 1982 [JP] Japan .............................. 57-165579

[51] Int. Cl.[4] ............................ H04J 3/02; H04J 3/06
[52] U.S. Cl. ....................................... 370/85; 370/108
[58] Field of Search ................ 370/85, 100, 103, 108

[56] References Cited

U.S. PATENT DOCUMENTS 4,140,877  2/1979  Joslow et al. ......................... 370/85
4,464,749  8/1984  Ulug ..................................... 370/85

FOREIGN PATENT DOCUMENTS 0028007  5/1981  European Pat. Off. .
1411056  10/1975  United Kingdom .

Primary Examiner—Douglas W. Olms
Assistant Examiner—Frank M. Scutch, III
Attorney, Agent, or Firm—Staas & Halsey

[57] ABSTRACT

An information communication system having a plurality of terminal equipment units, a network termination unit, a receive (R) line, and transmit (T) line. The terminal equipment units are commonly connected to the R and T line so as to communicate with the network termination unit. The communication is achieved in the form of successive frame signals, each composed of at least successive channels. Each terminal equipment determines a delay time for channel insertion into the frame signal on the T line. the delay time is determined during a learning identification algorithm operation which takes the transmission delay time along the R and T lines into consideration.

27 Claims, 16 Drawing Figures

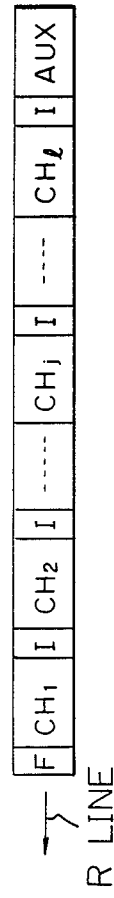
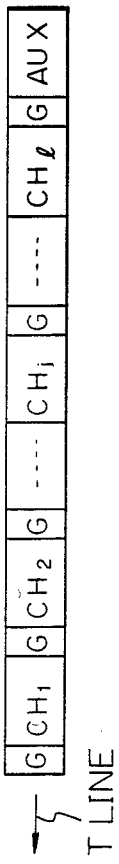
Fig. 3A PRIOR ART
Fig. 3B PRIOR ART

METHOD AND APPARATUS FOR ADJUSTING CHANNEL INSERTION TIMING

BACKGROUND OF THE INVENTION

1. Field of the Invention

The present invention relates to a method and apparatus for adjusting channel insertion timing, preferably applied to digital signal communication in a so-called integrated services digital network (ISDN).

2. Description of the Prior Art

As technology has advanced, the public has begun demanding a wider range of services from communication systems. One result of this has been the development of the ISDN. An important component of an ISDN is the so-called "network termination unit". A network termination unit functions as an interface between an external line and a plurality of terminal equipment units. The terminal equipment units are connected by a bus connection to the network termination unit via a common receiving (R) line and a common transmitting (T) line. Each terminal equipment unit receives digital signals provided from the network termination unit via the common R line. The digital signals are arranged into frame signals. Each frame signal is composed of successive channels. Each terminal equipment unit achieves communication with the network termination unit via one of the channels allotted thereto. Each terminal equipment unit also transmits digital signals to the network termination unit via the common T line. The transmitted digital signals are also arranged into frame signals. Therefore, each terminal equipment achieves communication with the network termination unit via the channel allotted thereto.

In each frame signal, the channels must be arranged sequentially without overlap. If one channel overlaps another, correct information transmission cannot be guaranteed for the two terminal equipment units concerned. To avoid such a channel overlap, in the prior art, large so-called, "guard bit areas" have been inserted between two adjacent channels.

There are problems, however, with the prior art method of guard bit areas. First, it is undesirable to insert a large number of guard bits into each frame signal since they do not themselves carry any information. Second, the longer the distance between the network termination unit and the terminal equipment unit, the larger the guard bit areas must be. Third, it is not easy for the network termination unit to reproduce a clock timing signal from a transmitted frame signal due to the presence of large guard bit areas.

SUMMARY OF THE INVENTION

It is an object of the present invention to overcome the above-mentioned problems of the prior art.

The above object is attained by making the channel insertion timing for the T line variable for each terminal equipment unit and by having the terminal equipment unit determine the correct timing in advance by a learning identification algorithm operation before the actual information transmission.

BRIEF DESCRIPTION OF THE DRAWINGS

The present invention will be more apparent from the ensuing description with reference to the accompanying drawings, wherein:

FIG. 3A and FIG. 3B depict formats of prior art frame signals;

DESCRIPTION OF THE PREFERRED EMBODIMENTS

Figure 1:
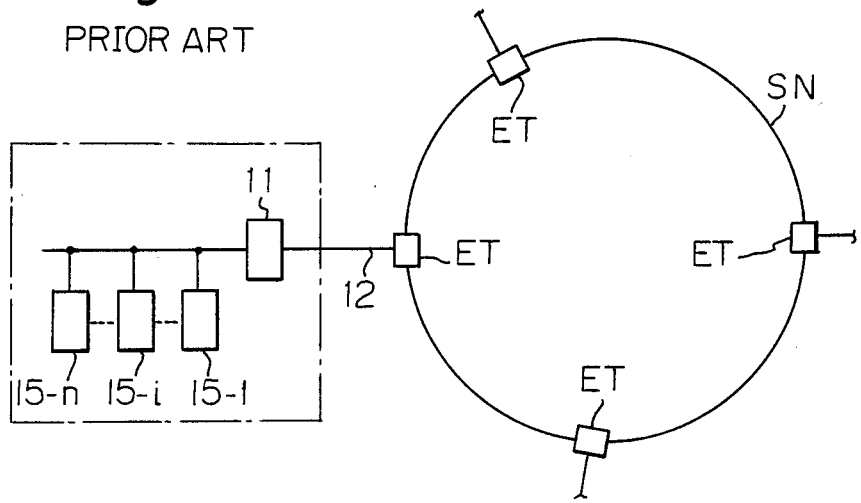
FIG. 1 is a schematic general view of an ISDN system.

FIG. 1 is a schematic general view of an ISDN system. In FIG. 1 a circle SN represents switching networks for telephone signals, telex signals, digital data, and the like. Each of the terminal equipment units 15-1 - - - 15-i - - - 15-n for subscribers achieves communication with another subscriber (not shown) by way of a network termination unit 11, an external line 12, an exchange termination unit ET, and the switching network SN. The present invention specifically refers to the portion enclosed by chain dotted lines.

Figure 2:
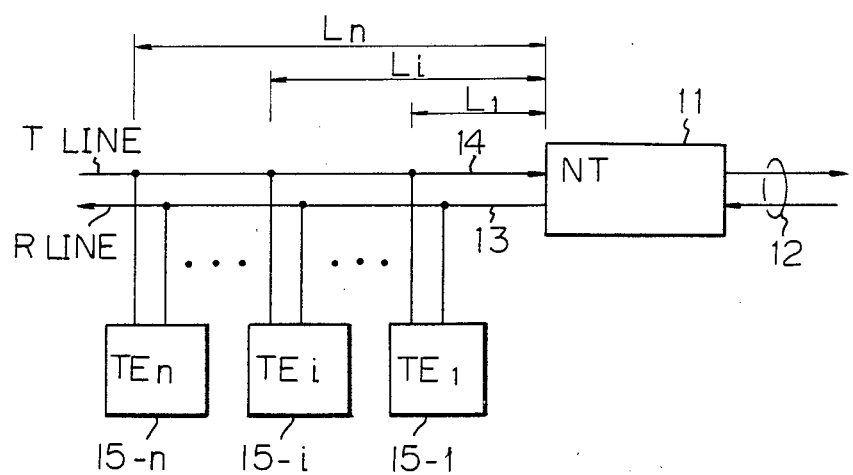
FIG. 2 is a more detailed circuit diagram of the portion enclosed by chain dotted lines in FIG. 1.

FIG. 2 is a more detailed circuit diagram of the portion enclosed by chain dotted lines in FIG. 1. In FIG. 2, reference numeral 13 represents the receive (R) line and 14 the transmit (T) line. The terminal equipment units ("TE's" for brevity) 15-1 - - - 15-i - - - 15-n are located at arbitrary distances L1, Li, and Ln, respectively, from the network termination unit ("NT" for brevity) 11. None of the distances is fixed, all are variable, due to, for example, movement of a telephone set from one place to another.

FIG. 3A and FIG. 3B depict formats of prior art frame signals. FIG. 3A depicts the format of the frame signal FR provided, via the R line 13, from NT 11 and received by TE 15-1, 15-i, and 15-n. FIG. 3B depicts the format of the frame signal to be transmitted from the TE's, via the T line 14, to NT 11. The frame signal on the R line 13 is composed of a frame synchronization signal F, a plurality of channels $CH_1$, $CH_2$ - - - $CH_j$ - - - $CH_l$, idle bit areas I, and an auxiliary bit area AUX, as shown in FIG. 3A. The area AUX is used for transmitting various types of control information, such as channel allocation and signaling information.

When one of TE's 15-1 through 15-n, for example, TE 15-i, receives the frame signal FR on the R line 13, TE 15-i can transmit information or data in a channel specified by the channel allocation, for example $CH_j$, of the frame signal of the T line 14 at a timing corresponding to $CH_j$ in reference to the just received frame synchronization signal F. Then, NT 11 receives the thus transmitted frame signal FT from the T line 14. It should be understood that FIG. 3B refers to an example where the frame signal on the T line 14 has no frame synchronization signal, as in the R line. Incidentally, the channel numbers represented by the suffixes 1 through l do not usually coincide with the terminal equipment numbers 1 through n.

As mentioned above, each terminal equipment unit TE transmits information or data at a timing corresponding to the allotted channel ($CH_1$ through $CH_l$) in reference to the frame synchronization signal F of the frame signal commonly received by all the terminal equipment units. Since the frame synchronization signal F is received at a different transmission delay time by each terminal equipment, however, adjacent channels often overlap in insertion timings for the frame signal on the T line 14. For example, with reference to FIG. 3B, the tailing bits of $CH_1$ overlap the leading bits of $CH_2$. To avoid such overlap, in the prior art method, large guard bit areas G are inserted between two adjacent channels. Idle bit areas I are also inserted into the frame signal FR on the R line 13 in conformity with the frame format of the frame signal FT on the T line 14. It is clear, therefore that the prior art tries to have the undesired overlap produced only within the guard bit areas G as the areas G are irrelevant to the actual information to be transmitted.

Figure 4:
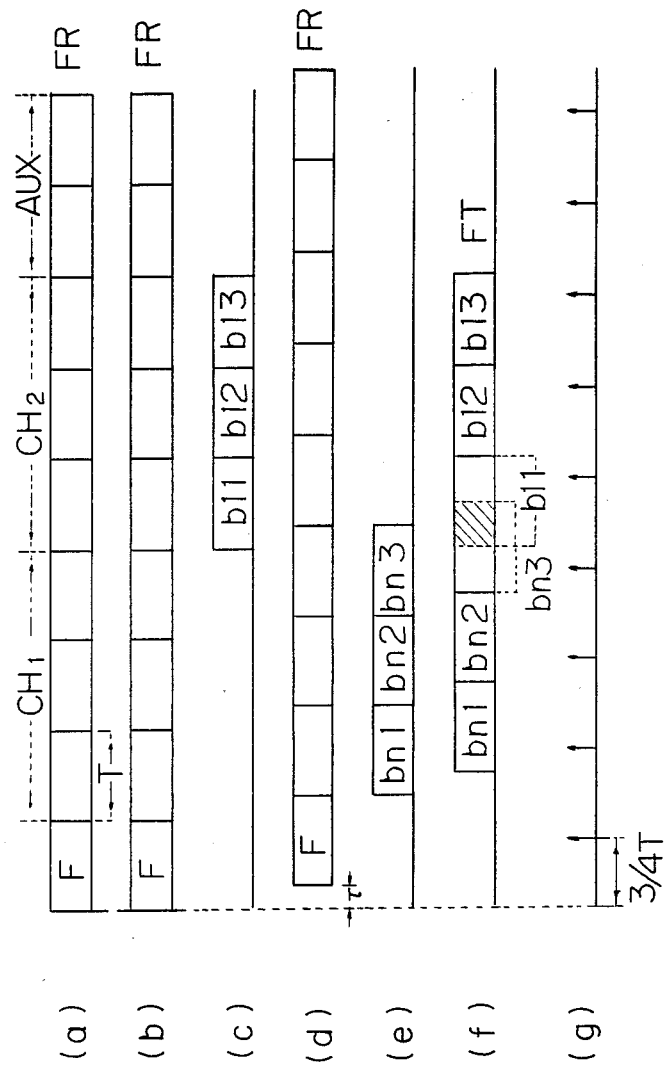
FIG. 4 depicts timing charts a thru g which are used for explaining generation of the overlap of the two adjacent channels.

This will be clarified with reference to FIG. 4. FIG. 4 depicts timing charts for explaining the generation of the overlap of two adjacent channels. The timing charts refer to a case where only two channels $CH_1$ and $CH_2$ exist. Row (a) is a format of the frame signal FR provided from the NT 11 via the R line 13. Row (b) is a format of the signal FR received by, for example, $TE_1$ in FIG. 2. In the signal FR, each of the channels $CH_1$ and $CH_2$ is composed of, for example, three bits, and the auxiliary bit area AUX is composed of, for example, two bits.

When $TE_1$ receives the signal FR of row (b), $TE_1$ transmits information composed of three bits b11, b12, and b13 (refer to row (c)) at a timing corresponding to the allotted channel, for example $CH_2$, with reference to the just received frame synchronization signal F of row (b). Soon after the reception of the signal FR at $TE_1$, another terminal equipment unit, for example $TE_n$ located further from NT 11 than $TE_1$, receives the same signal FR of row (d) with a certain transmission delay time $\tau$. Then, $TE_n$ transmits information composed of three bits bn1, bn2, and bn3 (refer to row (e)) at a timing corresponding to the allotted channel, for example $CH_1$, with reference to the thus delayed frame synchronization signal F of row (d).

As a result, NT 11 receives the frame signal FT transmitted via the T line 14 with a further delay time, as shown in row (f). Particular attention should be paid to the hatched area where the tailing bit bn3 overlaps the leading bit b11. In such a case, it may possible to reproduce the transmitted information in NT 11 correctly by using reading clock signals as shown in row (g), even if such overlap takes place. However, such reproduction by using the clock signal is available only in a case where the distance (refer to Ln in FIG. 2) is very short, for example, Ln is shorter than 250 m, assuming that the delay time $\Delta t$ is 5 ns/m and the transmission speed V is 200 kbps, based on the expression $2\Delta t Ln < \frac{1}{2}V$ (or $T/2$).

The above-mentioned overlap can be disregarded by employing large guard bit areas G if the distance Ln is long. However, with a long distance Ln, the bit length of the area G becomes extremely large. Also, it is not easy for NT 11 to reproduce the information from the signal FT due to the presence of large guard bit areas G. Consequently, the three above-described problems are inevitably induced in the prior art operation of the channel insertion into the signal FT.

Figure 5:
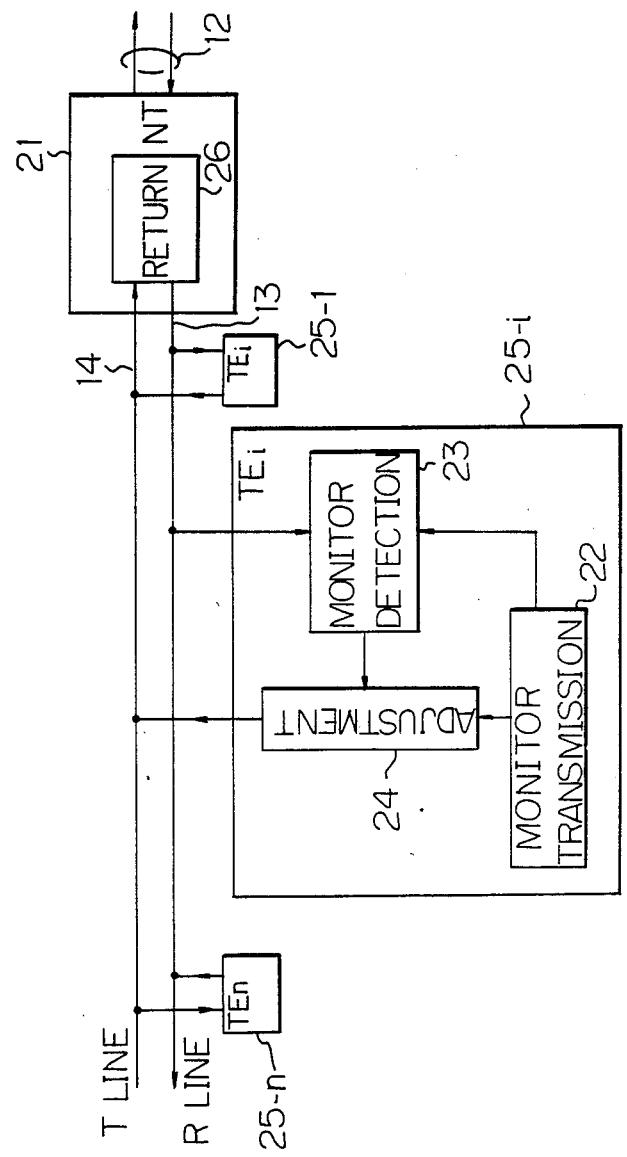
FIG. 5 is an schematic block diagram used for explaining the present invention.

FIG. 5 is an schematic block diagram used for explaining of the present invention. In FIG. 5, the external line 12, the R line 13, and the T line 14 are the same as those shown in FIG. 2. A network termination unit (NT) 21 and a terminal equipment unit (TE) 25-i according to the present invention corresponding to NT 11 and $TE_i$ 15-i are shown in FIG. 2, respectively. Since all the terminal equipment units (25-1 - - - 25-i - - - 25-n) have identical an circuit construction, only one TEi 25-i is illustrated in detail for simplicity.

The method of the present invention is characterized by the fact that each terminal equipment unit receives a frame synchronization signal comprising a part of the frame signal seen by a plurality of channels. Each terminal equipment unit transmits information in the frame signal at a timing corresponding to an allotted channel in reference to the just received frame synchronization signal, via the T line, to the network termination unit. Each terminal equipment unit is operative to transmit the information with a delay time. The delay time is determined to be proportional to the difference between a transmission time required for traveling on both the R and T lines between the network termination unit and the terminal equipment unit located farthest therefrom and a transmission time required for the same between the network termination unit and terminal equipment unit concerned.

In FIG. 5, reference numeral 22 represents a monitor bit transmission circuit for transmitting a monitor bit signal to NT 21 via the T line 14, 23 a detection circuit for detecting the monitor bit signal received from the R line 13, 24 a delay circuit for adjusting a delay time to be effected on the monitor bit signal, and 26 a loopback circuit for returning the monitor bit signal from the T line 14 to the R line 13. The circuit 24 for adjusting the delay time is adapted, in each TE, to minimize the phase deviation of the channel, which phase deviation causes the aforesaid overlap between two adjacent channels. In short, the delay time for the farthest TE should be minimum, while the delay time for the nearest TE should be maximum.

Figure 6A:
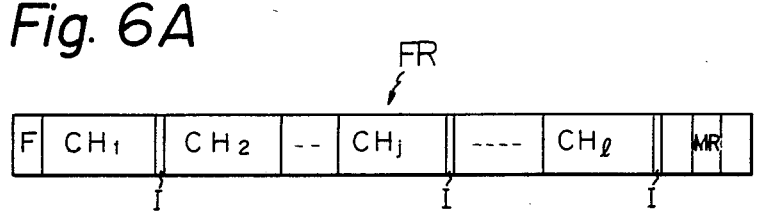
FIGS. 6A and 6B depict formats of frame signals according to the present invention.
Figure 6B:
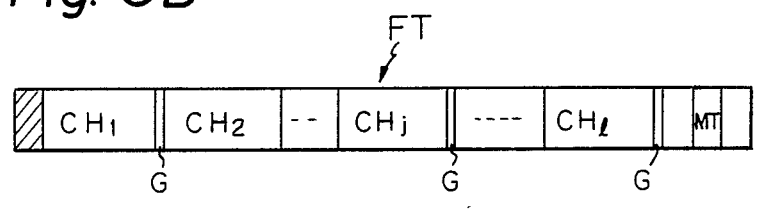

FIGS. 6A and 6B depict formats of frame signals according to the present invention. The differences from those of FIGS. 3A and 3B are that monitor bit signal MR and monitor bit signal MT are associated with the frame signals. It should be noted that the guard bit areas G and also the idle bit areas I, illustrated in FIGS. 6A and 6B, as in the prior art, can theoretically be removed completely according to the present invention. In actuality, however, it is preferable to leave them in. In this case, the areas G and I are very small compared to those of the prior art. If the delay circuit 24 for the adjustment is fabricated to have a very high degree of resolution, such areas G and I can completely be removed from the frame signals.

In FIGS. 6A and 6B, the monitor bit signal MT is produced in TE, for example 25-i, from the monitor bit transmission circuit 22 by way of the delay circuit 24 and inserted into the frame signal FT. The timing for the insertion of the signal MT is determined with reference to the just received frame synchronization signal F. The thus produced signal MT is transmitted with the signal FT via the T line 14 to NT 21. NT 21 operates to extract a certain bit or bits from the signal FT at a timing where the signal MT may just be received, which timing is predetermined in NT 25 by using a timing, a reference, at which an identical signal MT from the farthest TE 25-n is received. Then, the thus extracted certain bit or bits (it is not certain at the present stage whether they are just the signal MT) is returned or looped back as the signal MR in NT 21 by means of the loopback circuit 26 and transmitted on the R line 13. Then, TE 25-i receives the signal MR from the R line 13 at a timing where the signal MR in the signal FR may just have reached TE 25-i, with reference to the just received frame synchronization signal F. The sampled content of the received signal MR is compared with the content of the previously transmitted signal MT, which has been stored in a suitable storage means in TE 25-i.

In this case, if the received or sampled signal MR correctly contains the content of the transmitted signal MT, it is concluded that the delay time adjusted by the delay circuit 24 is correct for TE 25-i. The coincidence between the signals MT and MR may immediately occur for the farthest TE 25-n, because the return timing in NT 25 is predetermined in reference to the farthest TE. Such immediate coincidence is not expected for the TE's other than TE 25-n. The TE 25-l takes nearest NT the longest time to obtain such coincidence due to its relatively long learning identification algorithm operation, in which many successive frame signals FT and FR, each containing the signals MT and MR, must be used. Each signal MT can be a 1 bit signal. Therefore, each signal MR can be a 1 bit signal. In this case, the successive signals MT form a set of bit patterns. Therefore, the successive sampled signals MR form a set of bit patterns. These bit patterns are the same when the delay time is suitably adjusted. It should be noted that the signals MT and MR are not restricted to such 1 bit signals, but can be multiple bit signals.

Figure 7:
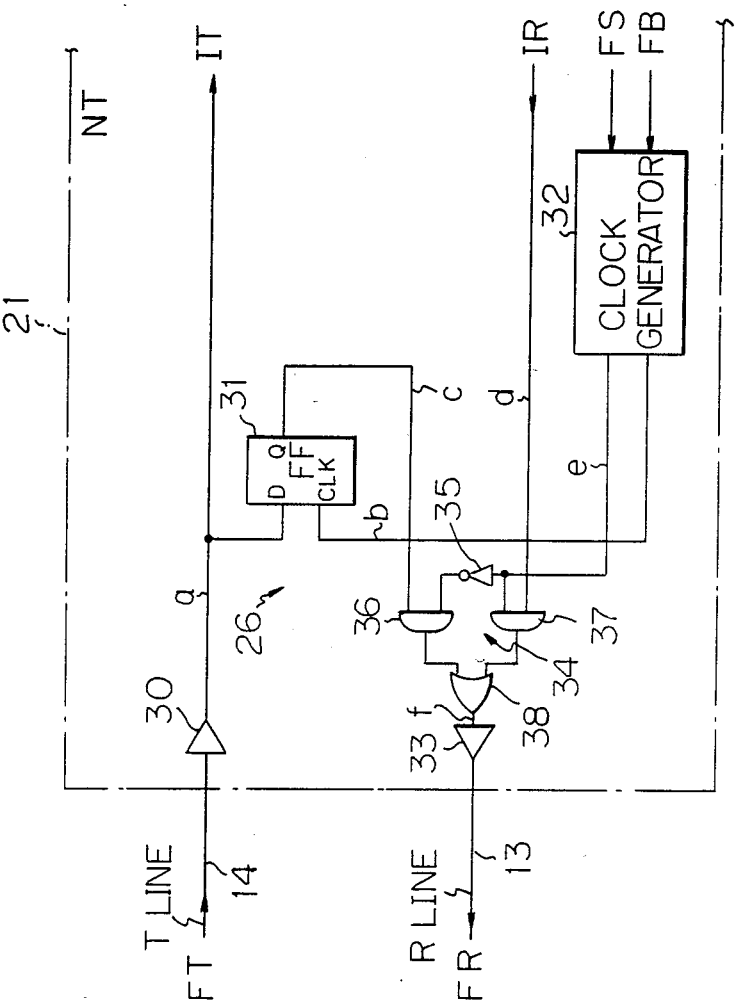
FIG. 7 is a diagram of a loop back circuit of FIG. 5 according to an embodiment of the present invention.
Figure 8:
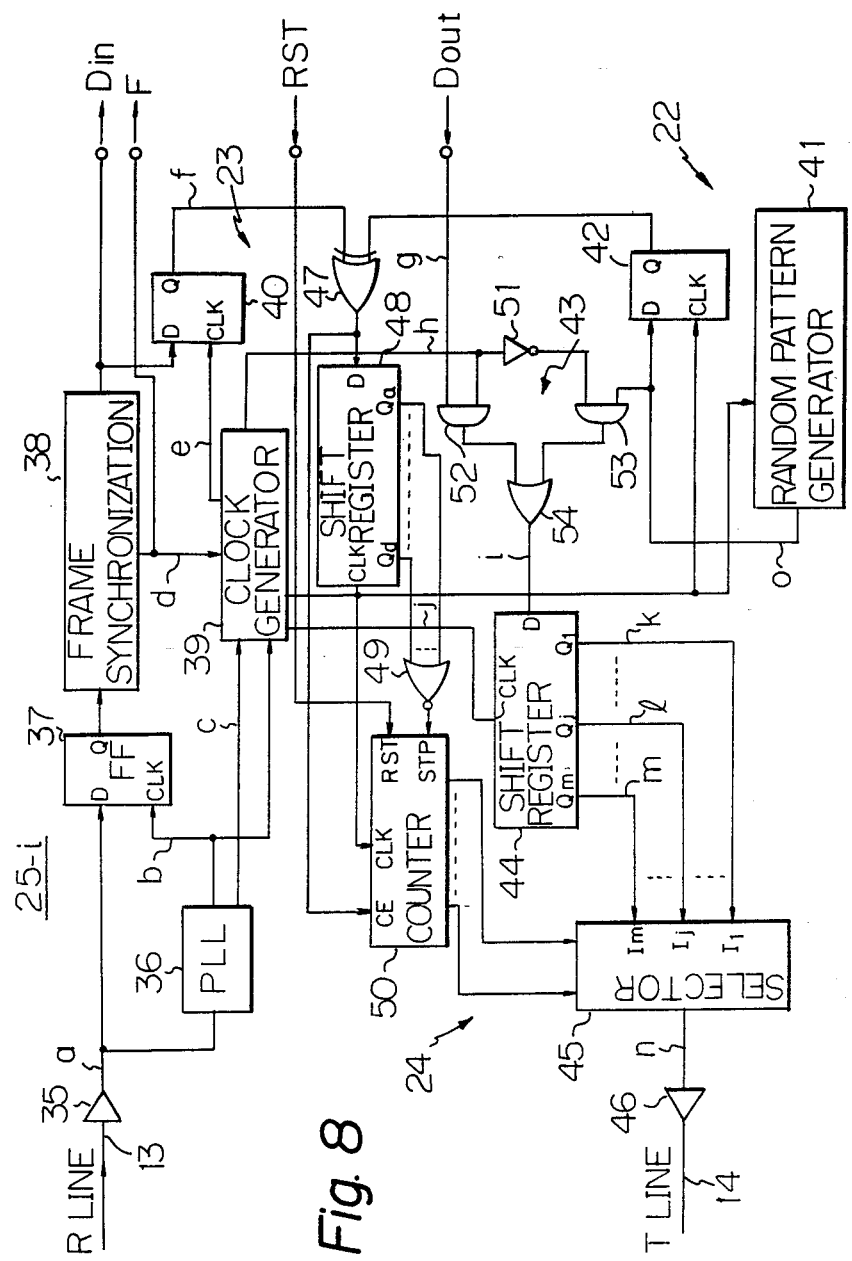
FIG. 8 is a diagram of other circuits in FIG. 5 according to an embodiment of the present invention.

FIG. 7 is a diagram of the loopback circuit 26 shown in FIG. 5 according to an embodiment of the present invention. FIG. 8 is a diagram of circuits 22, 23, and 24 shown in FIG. 5 according to an embodiment of the present invention. The method of the present invention will further be clarified with reference to FIGS. 7 and 8.

Figure 9:
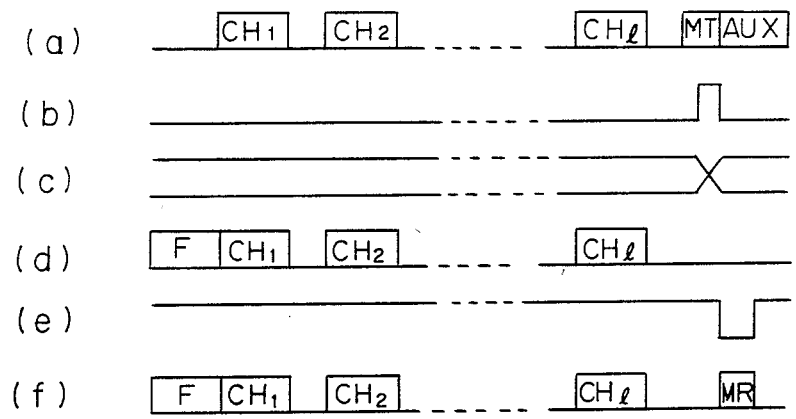
FIG. 9 depicts timing charts a thru f which are used for explaining the operation of the circuits shown in FIG. 7.

FIG. 9 depicts timing charts used for explaining the operation of the circuits shown in FIG. 7. The frame signal FT is transmitted from TEi 25-i (FIG. 5) on the T line 14 and received by NT 21 via a receiver 30. The output signal a from the receiver 30 is shown in row (a) of FIG. 9. The output signal a, i.e., the signal FT, includes the monitor bit signal MT in addition to the usual channels $CH_1$, $CH_2$, - - - , $CH_l$ and the auxiliary bit area AUX. From the signal FT, a D flip.flop 31 extracts only a certain bit, which bit is assumed to be the signal MT regardless of whether or not it is the bit signal MT, under control of a clock signal b (refer to row (b) of FIG. 9) from a clock generator 32.

It should be noted that the signal MT does not have the same timing as that of the clock b, at least when the learning identification algorithm operation is started. The learning identification algorithm operation is performed one time only when the TE's are initially installed and energized. The clock generator 32 is synchronized by both a frame signal clock FS and a frame bit clock FB. The clock b is adjusted, in advance, to be in phase with the signal MT transmitted from the farthest TE 25-n.

If the thus extracted or sampled, bit, as a pseudo monitor bit signal or real monitor bit signal, is logic "1", the output logic from a Q output is "1". Conversely, if the extracted bit is logic "0", the Q output produces logic "0". The logic of the Q output c is maintained until the next clock b is generated, as shown in row (c) of FIG. 9. The output c is transmitted to the R line 13 via a bit selector 34 and a driver 33 every time a clock e having logic "0" is produced from the clock generator 32 (refer to row (e) of FIG. 9). The clock b is in synchronism with the frame signal clock FS. During production of the clock e having logic "1", an information signal IR from the external line 12 (FIG. 5) is allowed to pass through the selector 34 (the information signal to be supplied to the line 12 (FIG. 5) is referenced by IT). The information signal IR is a signal d having a format as shown in row (d) of FIG. 9. Thus, the selector 34 provides such a signal f as shown in row (f) of FIG. 9. The bit selector 34 comprises an inverter 35, AND gates 36 and 37, and OR gate 38. As mentioned above, the circuit 26 returns the bit signal assumed to be the monitor bit signal MT, the assumed monitor bit signal MR, with the frame signal FR. Then, the terminal equipment 25-i starts operating for adjusting the delay time therefor.

Figure 10:
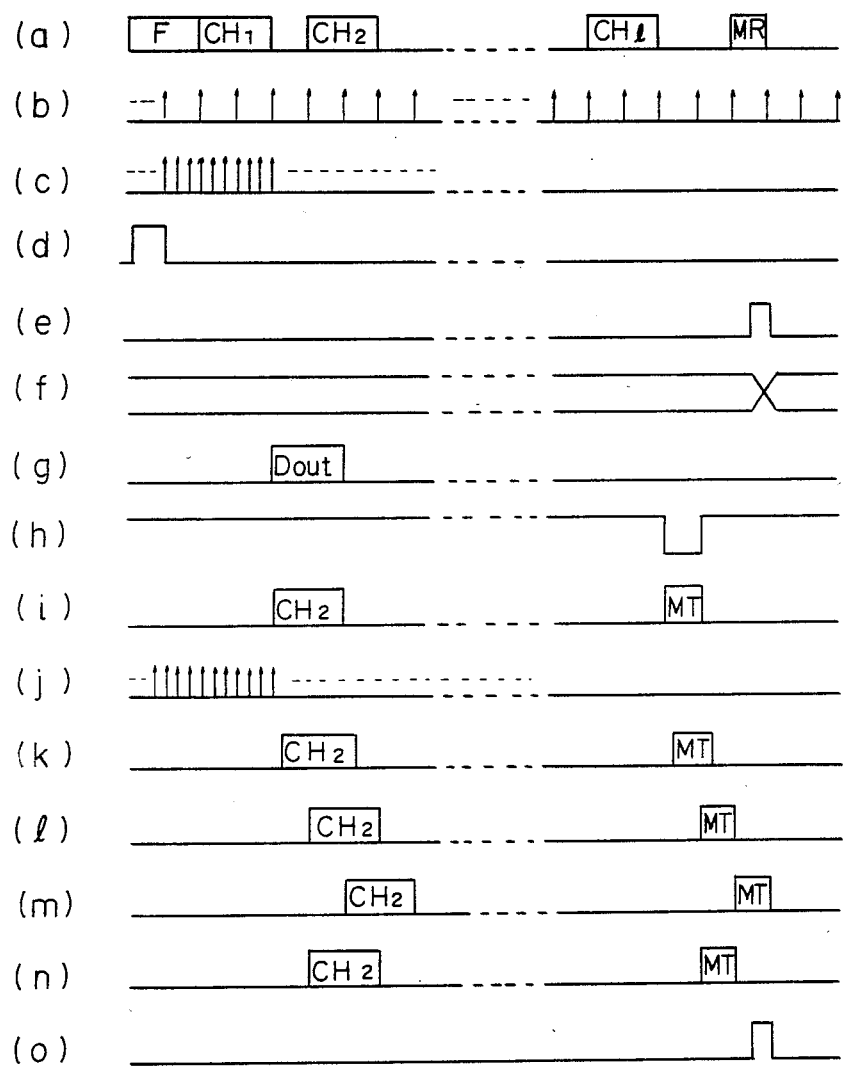
FIG. 10 depicts timing charts a thru o which are used for explaining the operation of the circuit of FIG. 8.

FIG. 10 depicts timing charts for explaining the operation of the circuit shown in FIG. 8. The members 13, 14, 22, 23, 24, and 25-i are the same as those of FIG. 5. The frame signal including the assumed monitor bit signal MR is received, from the R line 13, by a receiver 35. An output a from the receiver 35 has the format shown in row (a) of FIG. 10. The output a is applied, on one hand, to a phase-locked loop circuit (PLL) 36 which produces clock signals b and c in synchronism with the timing clock of the signal a, i.e., the received frame signal FR. However, the clock signals b and c have different frequencies, as shown in row (b) and (c) of FIG. 10. A type D flip.flop 37 picks up successive bit signals from the signal a by using the clock signal b. The thus obtained bit signals are then applied to a frame synchronization circuit 38 by which the frame synchronization signal F is detected from the signal a, i.e., signal FR. The thus detected signal d indicating the signal F is shown in row (d) of FIG. 10. At the same time, the circuit 38 transfers the channels $Ch_1$, $CH_2$ - - - $CH_l$, as an input data $D_{in}$. Only one of the channels, however, is valid for TE 25-i.

The thus obtained clock signals b, c and the frame synchronization signal d are supplied to a clock generator 39. The generator 39 produces several kinds of clock signals e, h, j, and o, which are important for driving the circuits 22, 23 and 24 of the present invention. The clock signal e (refer to row (e) of FIG. 10) is applied to a D flip.flop 40 so as to extract or sample only the assumed monitor bit signal MR, as a Q output signal f. The flip.flop 40 is part of the circuit 23 for detecting the monitor bit signal MR together with a gate 47. The signal f indicates the logic of the assumed bit signal MR maintained in every cycle of the clock signal e. The signal f, indicating the logic of the assumed signal MR, is applied to one input of the exclusive OR (EOR) gate 47. The other input of the EOR gate 47 receives a bit signal supplied from the circuit 22 for transmitting the monitor bit signal. The circuit 22 is comprised of a random pattern generator 41 and a D flip.flop 42. The generator 41 produces the monitor bit signal MT every time the clock signal o is generated (refer to row (o) of FIG. 10). The thus generated monitor bit signal MT has already been dispatched via the T line 14 to NT 21 with the preceding frame signal FT.

The same content of MT logic is maintained by the flip.flop 42 until the same signal MT has returned from NT 21, as sampled signal MR, and reaches the input of the EOR gate 47, because the flip.flop 42 is also clocked by the signal o. Thereafter, the EOR gate 47 compares the logic of the last monitor bit signal MT with the logic of the returned and assumed monitor bit signal MR. The resultant logic from the EOR gate 47 indicates coincidence or noncoincidence between the two bit signals. If the two bit signals coincide, such as ("1", "1") or ("0", "0"), the gate 47 produces the resultant logic of "0". If not, such as ("1", "0") or ("0", "1"), the gate 47 produces the resultant logic of "1".

In the adjustable delay circuit 24 for adjusting the delay time to be effected on the signal FT during the learning identification algorithm operation, the thus adjusted delay time is applied to the monitor bit signal MT. If the resultant logic from the EOR gate 47 is "1", the delay time must be extended. This is because the delay time is initially set as zero, as for the farthest TEn 25-n. The delay time is extended step by step sequentially until the resultant logic changes from "1" to "0".

Specifically, the adjustable delay circuit 24 operates as follows by means of members 44, 45, 48, 49, and 50. When the gate 47 produces logic "1" the logic "1" urges a counter 50 to increment by +1 the counted number every time the clock signal o is applied thereto, because the logic "1" is applied to a count enable terminal CE thereof. The output of the counter 50 controls a selector 45 to specify one of input ports $I_m$ - - - $I_j$ - - - $I_1$ thereof. The ports $I_m$, $I_j$, $I_1$ are connected respectively to output ports $Q_m$, $Q_j$, $Q_1$ of a shift register 44. The shift register 44 functions to produce m kinds of shifted signals with respect to an output signal i from an OR gate 54 of a bit selector 43. The selector 43 now opens an AND gate 53 and closes an AND gate 52 in response to the clock signal h and the clock signal h inverted through an inverter 51 (refer to row (h) of FIG. 10). The monitor bit signal MT from the generator 41 is supplied to a D input of the register 44 via the gate 53, now open, and the gate 54. The inputted signal MT (or a data $D_{out}$) is transformed into shifted signals by means of the register 44 and is produced as shifted signals such as shown in rows (k), (l), and (m) of FIG. 10 in synchronism with the clock signal j. It should be understood that each channel CH$_2$ in these rows and row (i) is now allotted to TE$_i$ 25-i.

Which one of the shifted signals must be taken as the signal MT is determined by the selector 45 with the aid of the aforesaid counter 50. In the example of FIG. 10, the shifted signal l is selected and produced as an output signal n, as shown in row (n) of FIG. 10. Thus, the delay time inherent to TE$_i$ 25-i is determined.

The counter 50 has a reset terminal RST and a stop terminal STP. The reset terminal RST is triggered to clear the content of the register 50 when the learning identification algorithm operation is commenced preceding a start of actual communication of information. The stop terminal STP is triggered when the NOR gate 49 produces a logic "1" signal. The logic "1" signal may be produced when the shift register 48 is full of logic "0" bits, so that the content of the counter 50 is fixedly maintained at the last counted value until another adjustment is required. The register 48 is useful to confirm that the monitor bit signals MT are in perfect phase with the signal MR. This prevents erroneous detection of timing due to a few erroneous logics "0" from the EOR gate 47.

Thus, the network termination unit 21 can pick up the monitor bit signal MT in row (a) of FIG. 9 at a fixed timing of the clock signal b shown in row (b) of FIG. 9. This is because a correct delay time for TE$_i$ 25-i is now established, which correct delay time can prevent the previously mentioned deleterious overlap between adjacent channels. Thereafter, a usual output data $D_{out}$ is transmitted via a driver 46 with the thus obtained correct delay time, whereby no overlap can take place between the adjacent channels.

Figure 11A:
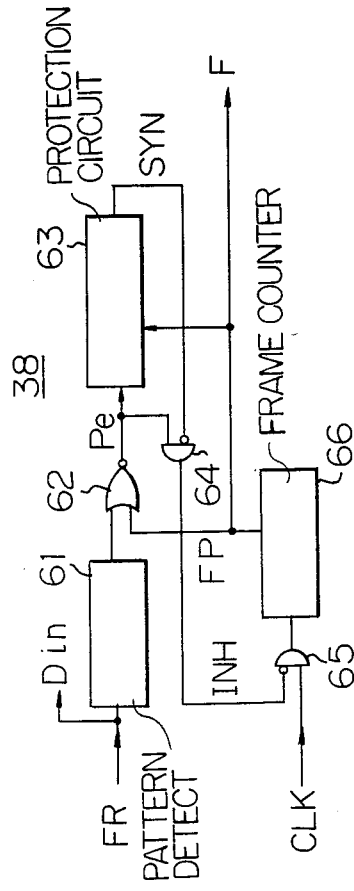
FIG. 11A is a diagram of one example of a frame synchronization circuit.
Figure 11B:
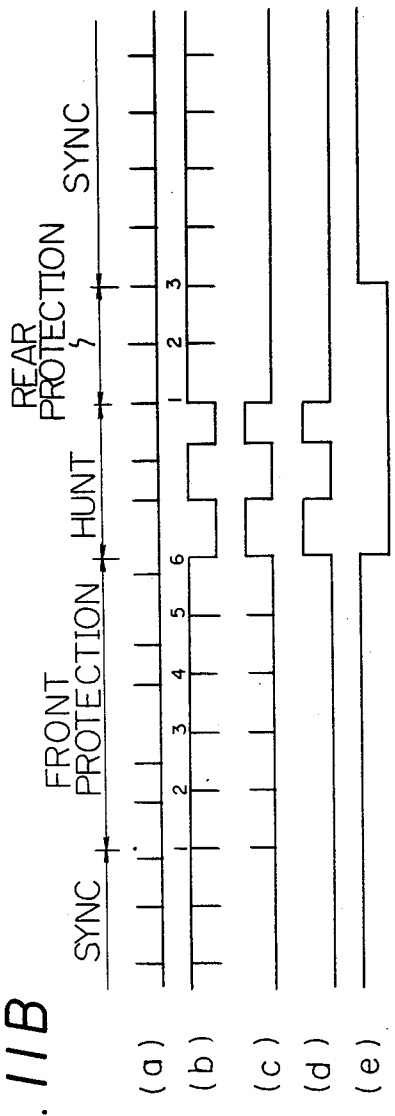
FIG. 11B depicts timing charts a thru e which are used for explaining the operation of the circuit 38 shown in FIG. 11A.

Major members in FIGS. 7 and 8 can easily be realized by skilled persons with commercially available circuits. However, examples of the members 38, 41, and 45 are disclosed below. FIG. 11A is a circuit diagram of one example of the frame synchronization circuit 38. FIG. 11B depicts timing charts used for explaining the operation of the circuit 38 shown in FIG. 11A. The frame signal FR is input via the flip.flop 37 (FIG. 8) to a pattern detecting circuit 61. The frame pattern thereof is detected at a timing as shown in row (a) of FIG. 11B. In this case, it is not considered that the detection is always achieved at each predetermined nominal frame pulse position. The output from the detecting circuit 61 is applied to a NOR gate 62 which detects whether the thus applied output coincides with frame pulses FP supplied from a frame counter 66. If coincidence occurs therebetween, no error indication pulse Pe is produced. If noncoincidence occurs therebetween, the error indication pulses Pe are produced with a timing as shown in row (c) of FIG. 11B at every frame pulse position as shown in row (b). The error pulses Pe are applied to a protection circuit 63. When the circuit 63 detects six continual noncoincidences (refer to "FRONT PROTECTION" in FIG. 11B), a signal SYN is changed to logic "0" level, and therefore, an AND gate 64, is opened via its inverting input terminal. The signal SYN indicates whether or not the frame synchronization is established. When the AND gate 64 is opened, the output thereof is applied, as an inhibit signal INH, to the frame counter 66, via an AND gate 65. Thus, the clock pulses CLK are not supplied to the counter 66. As a result, the frame pulse width from the counter 62 is expanded until the next frame pattern detection position comes. At the next frame pulse position, the frame counter 66 is reset and, at the same time, again starts counting the clock pulses CLK to detect, during a term of hunting (HUNT) whether a next input frame pulse exists just at the next frame pulse position. If no frame pulse exists, the clock pulses CLK are inhibited from being input into the counter 66. If a frame pulse exists, states in which there are no error pulses Pe are detected by the protection circuit 63. If three successive error pulses Pe do not exist at respective assumed timings, it is determined that the intended synchronization is established, in which the signal SYN has logic "1" level. In FIG. 11B, the characters SYNC indicate a term where a synchronization operation is achieved. The synchronized frame pulses are used as the frame synchronization signal F.

Figure 12:
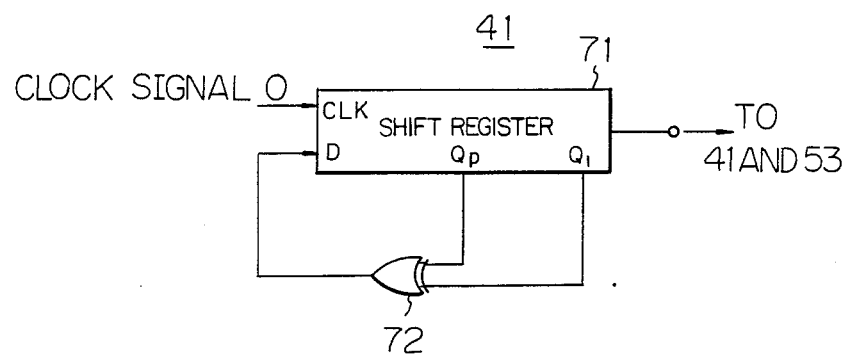
FIG. 12 is a circuit diagram of one example of a random pattern generator.

FIG. 12 is a circuit diagram of one example of the random pattern generator 41. In FIG. 12, the generator 41 comprises a shift register 71 and an exclusive OR gate 72. The gate 72 receives two bit signals from two arbitrary ports $Q_p$ and $Q_1$. The resultant logic therefrom is fed back to a data terminal D.

Figure 13:
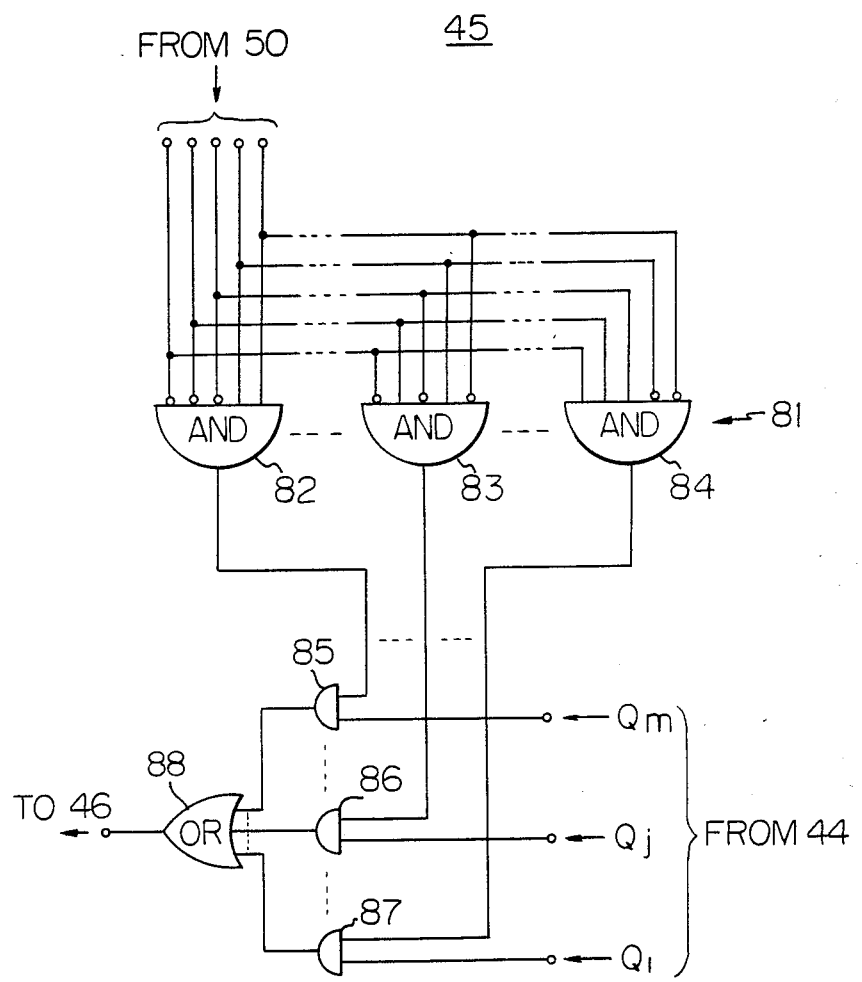
FIG. 13 is a circuit diagram of one example of a selector.

FIG. 13 is a circuit diagram of one example of the selector 45. In FIG. 13, the selector 45 has a decoder 81, in which one of AND gates 82, 83, 84, and so on is opened in response to the signals from the counter 50. If, for example, the AND gate 83 is opened, the corresponding AND gate 86 of AND gates 85, 86, 87, and so on is opened. Thereby, only the signal from the port $Q_j$ of the shift register 44 can pass through the selector 45 for supply to the driver 46 through an OR gate 88.

As explained above in detail, the present invention has three advantages: First, no guard bit areas G or idle bit areas I are needed or any such areas can be made very small. Therefore, the major part of the frame signals FT and FR can be utilized for transferring actual information signals. Second, the reading clock (refer to row (g) in FIG. 4) needs no phase adjustment, but is constant. This facilitates reproduction of information data in NT. This is because almost no overlap takes place between the channels. Thus, the hardware construction of NT can be simplified. Third, the length of each of the R and T lines can be much longer than that of the prior art R and T lines.

We claim:

1. A method for adjusting channel insertion timing in an information communication system, the system having a plurality of terminal equipment units connected by a bus connection to a single network termination unit via a common R (receiving) line and a common T (transmitting) line on which successive frame signals are transferred, each of the frame signals on the R line containing therein a frame synchronization signal, each of the frame signals on both T and R lines also containing multiple successive channels, each terminal equipment unit receiving information with each frame signal on the R line, at a timing corresponding to the channel allotted thereto, transmitted from the single network termination unit, and each terminal equipment unit transmitting information with each frame signal on the T line, at a timing corresponding to the allotted channel in reference to a just received frame synchronization signal, to the single network termination unit, said method comprising performing a learning identification algorithm operation prior to actual communication through with a suitable variable clock signal delay time is determined regarding the channel intersection timing in each terminal equipment unit such that overlap between adjacent channels being prevented.

2. A method for adjusting channel insertion timing in an information communication system, the system having a plurality of terminal equipment units connected by a bus connection to a network termination unit via a common R (receiving) line and a common T (transmitting) line on which successive frame signals are transferred, each of the frame signals on the R line containing therein a frame synchronization signal, each of the frame signals on both T and R lines also containing multiple successive channels, each terminal equipment unit receiving information with each frame signal on the R line, at a timing corresponding to the channel allotted thereto, transmitted from the network termination unit, and each terminal equipment unit transmitting information with each frame signal on the T line, at a timing corresponding to the allotted channel in reference to a just received frame synchronization signal, to the network termination unit, said method comprising performing a learning identification algorithm operation prior to actual communication through which a suitable delay time is determined regarding the channel insertion timing in each terminal equipment unit such that overlap between adjacent channels being prevented, said delay time being determined in accordance with a difference in time between a reference transmission delay time and each actual transmission delay time, the reference transmission delay time being the time required for transferring the frame signal along said R and T lines between the network termination unit and the terminal equipment unit placed farthest therefrom, said each transmission delay time being the time required for transferring the frame signal along the R and T lines between the network termination unit and an arbitrary terminal equipment unit to be adjusted.

3. A method as set forth in claim 2, wherein the method comprises the steps of:
   (a) transmitting a monitor bit signal from the terminal equipment unit along with the frame signal on the T line at a timing determined in reference to the received frame synchronization signal;
   (b) looping back the monitor bit signal on the T line from the network termination unit to the R line
   (c) receiving the frame signal on the R line and extracting the looped back monitor bit signal therefrom in the terminal equipment unit which dispatched the monitor bit signal, at a timing determined with reference to the just received frame synchronization signal;
   (d) extending the delay time to be applied to the monitor bit signal next by a predetermined amount during the period in which the contents of the transmitted and looped back monitor bit signals coincide with each other; and
   (e) fixing the last delay time determined when such coincidence occurs as the channel insertion timing to be used in the following actual communication of information.

4. A method as set forth in claim 3, wherein, in step (a), said monitor bit signal comprises a single-bit signal.

5. A method as set forth in claim 3, wherein, in step (a), said monitor bit signal comprises a multiple-bit signal.

6. A method as set forth in claim 4, wherein said terminal equipment unit includes a random pattern generator and said monitor bit signal is produced by the random pattern generator in synchronism with the frame synchronization signal.

7. A method as set forth in claim 3, wherein, in step (b), said monitor bit signal is looped back at a constant timing corresponding to a timing required for the monitor bit signals generated by said farthest terminal equipment unit to reach the network termination unit, with reference to the frame synchronization signal which has been dispatched therefrom.

8. A method as set forth in claim 7, wherein said terminal equipment unit includes a selector and said monitor bit signal to be looped back and both said frame synchronization signal and other channel information are sent alternatively via the selector.

9. A method as set forth in claim 3, wherein said terminal equipment unit includes a bit storage device and, in step (d), said transmitted monitor bit signal is stored in the bit storage device until the frame synchronization signal appears.

10. A method as set forth in claim 9, wherein said terminal equipment unit includes an exclusive OR gate and the stored monitor bit signal and the looped back monitor bit signal are compared by the exclusive OR gate.

11. A method as set forth in claim 10, wherein said terminal equipment unit includes a shift register, a counter and a selector, and said delay time is extended by the shift register, the counter, and the selector, the shift register producing a plurality of shifted signals of said monitor bit signal and also the channel information from output ports, the selector having gates and selecting one of the shifted signals by a corresponding gate, and the counter determining the corresponding gate to be opened according to its counted value, the counted value incrementing by one every time the exclusive OR gate produces a logic "0" signal.

12. A method as set forth in claim 3, wherein, in step (e), the last delay time is fixed when it is detected that said coincidence occurs continuously for a predetermined number of times.

13. A method of adjusting frame signal channel insertion timing in a communication system having a monitor bit loopback circuit connected between a transmit line and a receive line, comprising the steps of:
 (a) transmitting a monitor bit signal at a transmit timing in a frame signal on the transmit line;
 (b) sampling the receive line at a sampling interval;
 (c) determining whether the transmitted monitor bit signal coincides with the sample; and
 (d) adjusting the transmit timing by delaying a transmit clock signal if there is no coincidence, where the transmit timing is the channel insertion timing when there is coincidence.

14. A method as set forth in claim 13, wherein step (d) comprises increasing a delay time associated with the transmit timing by a predetermined amount.

15. A method of adjusting frame signal channel insertion timing in a communication system having a monitor bit loopback circuit connected between a transmit line and a receive line, comprising the steps of:
 (a) transmitting a monitor bit signal at a transmit timing in a frame signal on the transmit line;
 (b) sampling the receive line at a sampling interval, the frame signal includes a frame synchronization signal and the sampling interval is determined with reference to a last received frame synchronization signal;
 (c) determining whether the transmitted monitor bit signal coincides with the sample; and
 (d) adjusting the transmit timing if there is no coincidence, where the transmit timing is the channel insertion timing when there is coincidence.

16. A method of adjusting frame signal channel insertion timing in a communication system having a monitor bit loopback circuit connected between a transmit line and a receive line, comprising the steps of:
 (a) transmitting a monitor bit signal at a transmit timing in a frame signal on the transmit line;
 (b) sampling the receive line at a sampling interval;
 (c) determining whether the transmitted monitor bit signal coincides with the sample; and
 (d) adjusting the transmit timing if there is no coincidence, where the transmit timing is the channel insertion timing when there is coincidence, and the transmit timing becomes the channel insertion timing after a predetermined number of sequential coincidences occur.

17. A network communication system for connecting communicating units and transmitting information via frame signals, comprising:
 a switching network having exchange termination units;
 a network termination unit operatively connected to each of said exchange termination units and having a loopback circuit;
 a transmit line operatively connected to each of said network termination units;
 a receive line operatively connected to each of said network termination units; and
 terminal equipment units operatively connected to one of said communicating units, said receive line and said transmit line, each of said terminal equipment units comprising:
  monitor bit detection means, operatively connected to said receive line and the one of the communicating units, for sampling the frame signal on the receive line;
  monitor bit transmission means, operatively connected to said monitor bit detection means, for generating a transmittable monitor bit signal; and
  insertion adjustment means, operatively connected to said transmit line, said monitor bit detection means and said monitor bit transmission means, for adjusting an insertion timing of and inserting the transmittable monitor bit signal in the frame signal on said transmit line, said monitor bit detection means generating a detection signal when a previously inserted transmittable monitor bit signal and the sample coincide, said insertion adjustment means adjusting the insertion timing when the detection signal is not generated.

18. A system as set forth in claim 17, wherein said monitor bit detection means comprises:
 a frame synchronization circuit operatively connected to said receive line and the one of said communicating units;
 a first flip-flop operatively connected to said frame synchronization circuit; and
 an exclusive OR gate operatively connected to said first flip-flop, said monitor bit transmission means and said insertion adjustment.

19. A system as set forth in claim 18, wherein said monitor bit transmission means comprises:
 a random pattern generator circuit operatively connected to said insertion adjustment means; and
 a second flip-flop operatively connected to said random pattern generator circuit and said exclusive OR gate.

20. A system as set forth in claim 19, wherein said insertion adjustment means comprises:
 a first shift register operatively connected to said exclusive OR gate;
 a NOR gate operatively connected to said first shift register;
 a counter operatively connected to said NOR gate;
 a second shift register operatively connected to the one of the communicating units and said random pattern generator circuit; and
 a selector operatively connected to said counter, said second shift register and said transmit line.

21. A system as set forth in claim 20, further comprising:
 a bit selector operatively connected to said second shift register, said random pattern generator circuit and the one of the communicating units;

a phase lock loop operatively connected to said receive line;
a third flip-flop operatively connected to said receive line, said phase lock loop and said frame synchronization circuit; and
a clock generation circuit operatively connected to said phase lock loop, said frame synchronization circuit, said first flip-flop, said bit selector, said second flip-flop, said random pattern generator circuit, said first shift register, said second shift register and said counter.

22. A system as set forth in claim 17, wherein said loopback circuit comprises:
a flip-flop operatively connected to said transmit line;
a bit selector operatively connected to said flip-flop and said receive line; and
a clock generation circuit operatively connected to said flip-flop and said bit selector.

23. A terminal equipment unit connected to receive and transmit lines and a communicating unit in a communication system, comprising:
monitor bit detection means, operatively connected to the receive line and the communicating unit, for sampling a frame signal on the receive line;
monitor bit transmission means, operatively connected to said monitor bit detection means, for generating a transmittable monitor bit signal; and
insertion adjustment means, operatively connected to the transmit line, said monitor bit detection means and said monitor bit transmission means, for adjusting a variable insertion timing of and inserting the transmittable monitor bit signal in the frame signal on the transmit line, said monitor bit detection means generating a detection signal when a previously inserted transmittable monitor bit signal and the sample coincide, said insertion adjustment means adjusting the insertion timing when the detection signal is not generated by adjusting the delay of an insertion clock signal and the inserted transmittable monitor bit signal returning on the receive line.

24. A terminal equipment unit connected to receive and transmit lines and a communicating unit in a communication system, comprising:
monitor bit detection means, operatively connected to the receive line and the communicating unit, for sampling a frame signal on the receive line, said monitor bit detection means comprising:
a frame synchronization circuit operatively connected to the receive line and the communicating unit;
a flip-flop operatively connected to said frame synchronization unit; and
an exclusive OR gate operatively connected to said flip-flop, said monitor bit transmission means and said insertion adjustment means;
a monitor bit transmission means, operatively connected to said monitor bit detection means, for generating a transmittable monitor bit signal; and
insertion adjustment means, operatively connected to the transmit line, said monitor bit detection means and said monitor bit transmission means, for adjusting an insertion timing of and inserting the transmittable monitor bit signal in the frame signal on the transmit line, said monitor bit detection means generating a detection signal when a previously inserted transmittable monitor bit signal and the sample coincide, said insertion adjustment means adjusting the insertion timing when the detection signal is not generated and the inserted transmittable monitor bit signal returning on the receive line.

25. A terminal equipment unit connected to receive and transmit lines and a communicating unit in a communication system, comprising:
monitor bit detection means, operatively connected to the receive line and the communicating unit, for sampling a frame signal on the receive line;
monitor bit transmission means, operatively connected to said monitor bit detection means, for generating a transmittable monitor bit signal, said monitor bit transmission means comprising:
a random pattern generator circuit operatively connected to said insertion adjustment means; and
a flip-flop operatively connected to said random pattern generator circuit and said monitor bit detection means; and
insertion adjustment means, operatively connected to the transmit line, said monitor bit detection means and said monitor bit transmission means, for adjusting an insertion timing of and inserting the transmittable monitor bit signal in the frame signal on the transmit line, said monitor bit detection means generating a detection signal when a previously inserted transmittable monitor bit signal and the sample coincide, said insertion adjustment means adjusting the insertion timing when the detection signal is not generated and the inserted transmittable monitor bit signal returning on the receive line.

26. A terminal equipment unit connected to receive and transmit lines and a communicating unit in a communication system, comprising:
monitor bit detection means, operatively connected to the receive line and the communicating unit, for sampling a frame signal on the receive line;
monitor bit transmission means, operatively connected to said monitor bit detection means, for generating a transmittable monitor bit signal; and
insertion adjustment means, operatively connected to the transmit line, said monitor bit detection means and said monitor bit transmission means, for adjusting an insertion timing of and inserting the transmittable monitor bit signal in the frame signal on the transmit line, said monitor bit detection means generating a detection signal when a previously inserted transmittable monitor bit signal and the sample coincide, said insertion adjustment means adjusting the insertion timing when the detection signal is not generated and the inserted transmittable monitor bit signal returning on the receive line, said insertion adjustment means comprising:
a first shift register operatively connected to said monitor bit detection means;
a NOR gate operatively connected to said first shift register;
a counter operatively connected to said NOR gate;
a second shift register operatively connected to the communicating unit and said monitor bit transmission means; and
a selector operatively connected to said counter, said second shift register and the transmit line.

27. A terminal equipment unit connected to receive and transmit lines and a communicating unit in a communication system, comprising:

monitor bit detection means, operatively connected to the receive line and the communicating unit, for sampling a frame signal on the receive line;

monitor bit transmission means, operatively connected to said monitor bit detection means, for generating a transmittable monitor bit signal;

insertion adjustment means, operatively connected to the transmit line, said monitor bit detection means and said monitor bit transmission means, for adjusting an insertion timing of and inserting the transmittable monitor bit signal in the frame signal on the transmit line, said monitor bit detection means generating a detection signal when a previously inserted transmittable monitor bit signal and the sample coincide, said insertion adjustment means adjusting the insertion timing when the detection signal is not generated and the inserted transmittable monitor bit signal receiving on the receive line;

a bit selector operatively connected to said insertion adjustment means, said monitor bit transmission means and the communicating unit;

a phase lock loop operatively connected to the receive line;

a flip-flop operatively connected to the receive line, said phase lock loop and said monitor bit detection means; and a clock generation circuit operatively connected to said phase lock loop, said monitor bit detection means, said monitor bit transmission means and said insertion adjustment means.

* * * * *

UNITED STATES PATENT AND TRADEMARK OFFICE
CERTIFICATE OF CORRECTION

PATENT NO. : 4,562,573
DATED : December 31, 1985
INVENTOR(S) : KAZUO MURANO ET AL.

It is certified that error appears in the above-identified patent and that said Letters Patent is hereby corrected as shown below:

Front page, [75] Inventors, "Musashino" should be --Tokyo--;

"Yokohama" should be --Kanagawa--.

Col. 2, line 10, "an" should be --a--.

Col. 3, line 29, after "therefore" insert --,--.

Col. 4, line 20, "identical an" should be --an identical--.

Col. 5, line 9, after "timing," insert --as--;

line 30, delete "takes";

line 31, after "NT" insert --takes--.

Col. 6, line 5, "sampled," should be --sampled--;

line 26, after "MT," insert --as--.

Col. 16, line 2, "receiving" should be --returning--.

Signed and Sealed this

Twenty-fourth Day of June 1986

[SEAL]

Attest:

DONALD J. QUIGG

Attesting Officer

Commissioner of Patents and Trademarks